US012644748B2

(12) United States Patent
Kenyon

(10) Patent No.: US 12,644,748 B2
(45) Date of Patent: Jun. 2, 2026

(54) TRANSMITTER MOUNTING BRACKET USING PROCESS FLANGE STUDS

(71) Applicant: Rosemount Inc., Shakopee, MN (US)

(72) Inventor: Nathaniel K. Kenyon, Westminster, CO (US)

(73) Assignee: Rosemount Inc., Shakopee, MN (US)

( * ) Notice: Subject to any disclaimer, the term of this patent is extended or adjusted under 35 U.S.C. 154(b) by 294 days.

(21) Appl. No.: 18/169,544

(22) Filed: Feb. 15, 2023

(65) Prior Publication Data

US 2024/0271982 A1 Aug. 15, 2024

(51) Int. Cl.
 *G01F 15/18* (2006.01)
 *G01F 1/36* (2006.01)
(52) U.S. Cl.
 CPC .............. *G01F 15/185* (2013.01); *G01F 1/36* (2013.01)
(58) Field of Classification Search
 CPC .... G01F 15/18; G01F 15/185; G01F 1/34–50; G01D 11/30
 See application file for complete search history.

(56) References Cited

U.S. PATENT DOCUMENTS

| | | | | |
|---|---|---|---|---|
| 5,228,181 A * | 7/1993 | Ingle | ....................... | B25B 27/16 |
| | | | | 29/272 |
| 9,476,744 B2 * | 10/2016 | Hering | ...................... | G01F 1/42 |
| 9,861,848 B2 * | 1/2018 | Hyland | ................... | G01M 3/00 |
| 10,107,700 B2 * | 10/2018 | Hedtke | ................... | G01L 13/02 |

FOREIGN PATENT DOCUMENTS

| | | | |
|---|---|---|---|
| KR | 20000064478 A | 11/2000 | |
| WO | WO-9722855 A1 * | 6/1997 | ............ F16L 41/008 |

OTHER PUBLICATIONS

"Magnetic-inductive flowmeter" by ELA as downloaded by the Internet Archive Wayback Machine at the internet address https://www.elabrno.cz/wp-content/uploads/2018/11/EN-prospect-MQI-99-SMART-C-S.pdf on Aug. 14, 2022.*
International Search Report and Written Opinion for PCT Application No. PCT/US2024/014560, dated Jun. 4, 2024, 10 pages.
Wedgetype flow meter: Viscous meter: Primary flow signal Data Sheet. Primary Flow Signal, Inc. (Nov. 7, 2022) from https://www.primaryflowsignal.com/products/wedgetype-flow-meters/wm-wedgetype-flow-meter/, 2 pages.
"Wedge Flowmeter." Huahai Flowmeter, http://ehuahai.net/wedge-flowmeter, 9 pages.
"Wedge Flow Element PPT Video Online Download." SlidePlayer, https://slideplayer.com/slide/6636291/, 10 pages.

* cited by examiner

*Primary Examiner* — Justin N Olamit
(74) *Attorney, Agent, or Firm* — Christopher R. Christenson; Kelly, Holt & Christenson, P.L.L.C.

(57) ABSTRACT

A process fluid sensing assembly includes a process fluid conduit having a pair of flanged connections and a mounting bracket mounted to at least two process flange studs of at least one flanged connection. A field device is mounted to the mounting bracket. A wedge-type flow meter as well as a method of coupling a field device to at least one process flange is also provided.

15 Claims, 14 Drawing Sheets

TRANSMITTER MOUNTING BRACKET USING PROCESS FLANGE STUDS

BACKGROUND

A field device is a device that is coupleable to a process, such as a manufacturing or refining process, to support the process by providing one or more functions of measuring and controlling parameters associated with the process. A field device is so named due to its ability to be mounted in the field. "Field" is generally an external area in a process installation that may be subject to climatological extremes, vibration, changes in humidity, electromagnetic or radiofrequency interference, or other environmental challenges. Thus, the robust physical package of such a field device provides it with the ability to operate in the "field" for extended periods (such as years) at a time.

Field devices such as process variable transmitters, are used in the process control industry to remotely sense a process variable. Field devices such as actuators, are used by the process control industry to remotely control physical parameters of a process, such as flow rate, temperature, etc. The process variable may be transmitted to a control room from a field device such as a process variable transmitter for providing information about the process to a controller. The controller may then transmit control information to a field device such as an actuator to modify a parameter of the process. For example, information related to pressure of a process fluid may be transmitted to a control room and used to control a process such as oil refining.

Process variable transmitters are used to monitor process variables associated with fluids such as slurries, liquids, vapors and gasses in chemical, pulp, petroleum, gas, pharmaceutical, food and other fluid processing plants. Process variables include pressure, temperature, flow, level, pH, conductivity, turbidity, density, concentration, chemical composition and other fluid properties. Process actuators include control valves, pumps, heaters, agitators, coolers, solenoids, vents and other fluid controlling devices.

Wedge-type differential pressure flow meters can measure flow rates in applications that are problematic for traditional flow meters such as orifice plates with impulse lines and other competing technologies. These devices introduce a partial flow obstruction in the form of a wedge in the process fluid conduit and then measure process fluid pressure both upstream and downstream of the wedge. The difference in the process fluid pressure between the upstream and downstream measurements provides an indication of process fluid flow. Some particularly advantageous applications for wedge-type process fluid flow devices include applications that may plug or clog an impulse line. Therefore, wedge-type flow meters are often coupled with remote seals to transmit the differential pressure signal to a differential pressure transmitter. The full wedge flow meter solution generally consists of a primary element wedge spool-style meter, a set of balanced remote seals, and a differential pressure transmitter. Minimizing remote seal capillary length has numerous advantages such as better system time response and reduced temperature-related inaccuracies.

SUMMARY

A process fluid sensing assembly includes a process fluid conduit having a pair of flanged connections and a mounting bracket mounted to at least two process flange studs of at least one flanged connection. A field device is mounted to the mounting bracket. A wedge-type flow meter as well as a method of coupling a field device to at least one process flange is also provided.

BRIEF DESCRIPTION OF THE DRAWINGS

FIGS. 6A and 6B show a bracket mounting a differential pressure transmitter to a pair of parallel process flanges in accordance with another embodiment of the present invention.

FIGS. 7A and 7B show a bracket having a pair of holes spaced to mount to studs of a WSP remote seal flange in accordance with an embodiment of the present invention.

DETAILED DESCRIPTION OF ILLUSTRATIVE EMBODIMENTS

When developing a fully integrated wedge flow meter, one challenge is mounting the differential pressure transmitter and remote seals with the primary element in such a way as to be perceived as 'direct mount' or 'close-coupled' while accomplishing all the design goals including: positioning the differential pressure transmitter at a convenient location for electronics access (e.g. commissioning, zeroing, maintaining, et cetera); ensuring that the differential pressure transmitter does not overheat if the process fluid pipe contains high temperature fluids and radiates heat; reducing or minimizing remote seal capillary length as much as practical; ensuring that the differential pressure transmitter will not zero-drift (rotate in an axis that will offset the zero) under long term field vibration; providing a cost effective mounting option compared to alternative solutions; and providing a differential pressure transmitter mounting that is synchronous with preferred primary element mounting orientations.

Figure 1:
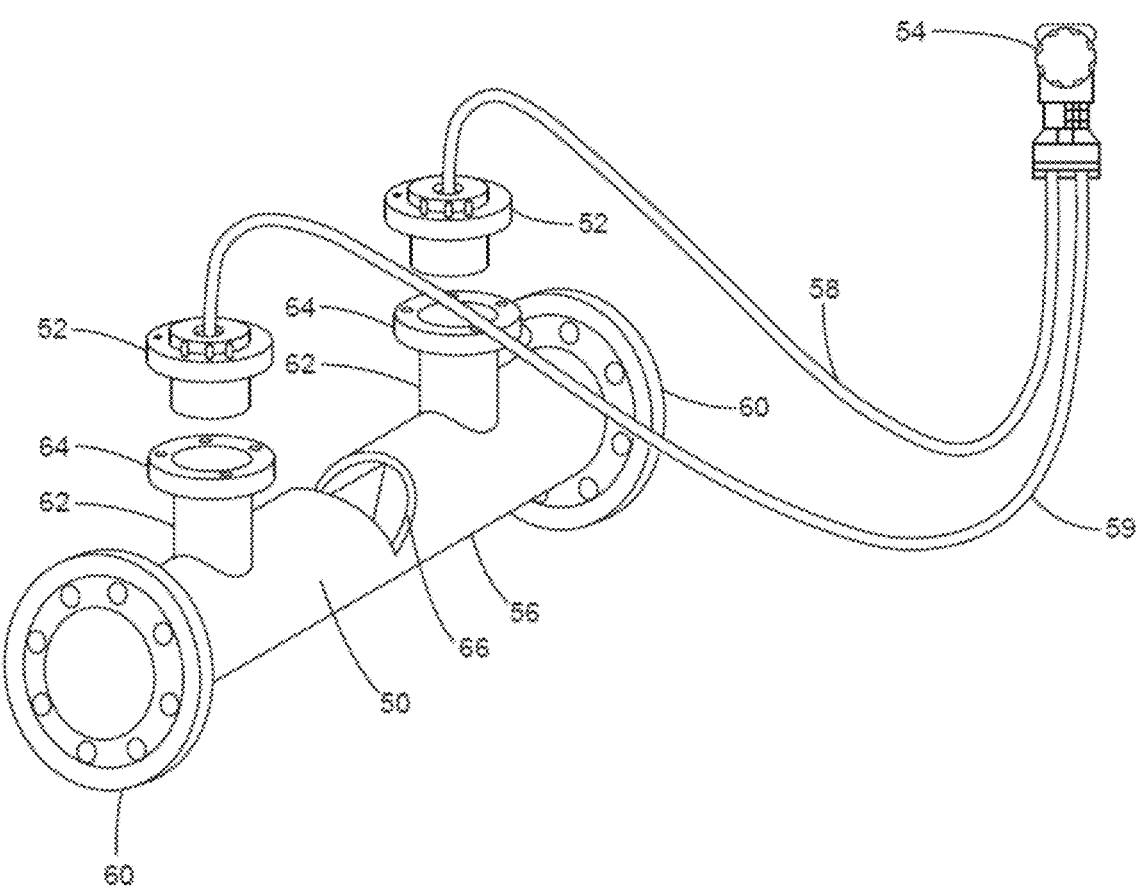
FIG. 1 is a diagrammatic view of a known wedge-type flow meter with which embodiments described herein are particularly useful.

FIG. 1 is a diagrammatic view of a known wedge-type flow meter with which embodiments described herein are particularly useful. The most common transmitter mounting solution for wedge-type flow meters 50 with remote seals 52 is to mount the transmitter 54 away from the primary element 56 using relatively long capillaries 58 and a traditional transmitter mounting bracket or equivalent. The primary element 56 generally includes a pair of process fluid piping flanges 60 as well as a pair of pressure branches 62 each having a process flange 64 to couple to remote seals 52. The pressure branches 62 are located on opposite sides of a partial flow obstruction (i.e. wedge) 66, which is shown cutaway for purposes of illustration. This technique requires relatively long capillaries 58, which cause a longer system time response and larger possible temperature effects are present. It also is a higher cost for the user as the user must pay for longer capillaries and commission the mounting of the transmitter.

Some commercially-available wedge-type flow meters do provide relatively-close coupled differential pressure transmitter mountings. However, such close-coupled wedge meter transmitter mountings involve welding a piece of metal pipe or bar to the meter body and affixing the transmitter to the protruding pipe by way of mounting bracket.

Known approaches have a number of limitations. One such limitation is expense. Although relatively simple, adding $15-40 in direct material cost of 2" NPS pipe, rectangular bar, or C-channel in addition to a mounting bracket, machining labor, and welding labor leaves room for improvement. Another limitation is the requirement for welding. Welding the pipe section or metal bar to the meter requires welding labor and prep work and the pipe or bar may need to be contoured to match the meter spool outside diameter. It is generally a design goal that welding onto the meter spool be minimized to prevent the spool from unnecessarily deforming due to the heat and internal stresses of the weld. Further, less welding leads to a more predictable spool minimizing meter-to-meter variation.

Figure 2:
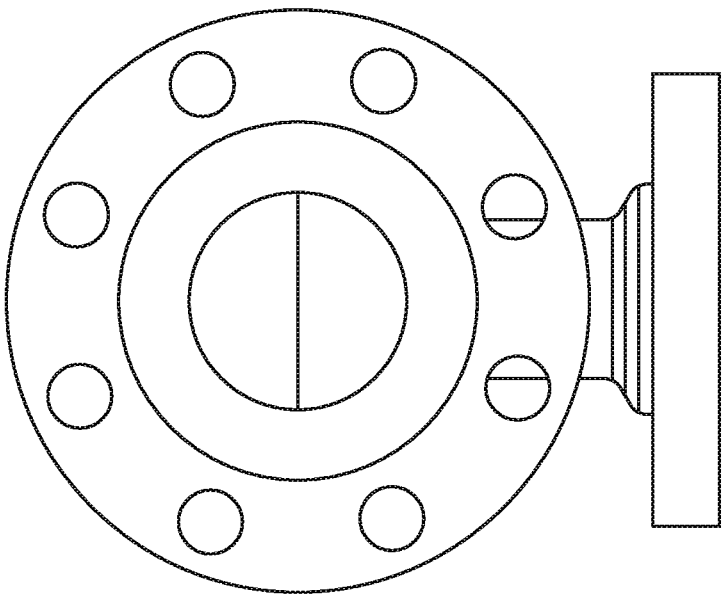
FIG. 2 is a diagrammatic view of a preferred wedge primary element mounting orientation for liquids, gases, and steam.

Yet another limitation is related to the transmitter orientation and location. For some known transmitter mountings, the orientation of the transmitter is not aligned with the recommended orientation of an installed wedge flow meter. In all fluid types (liquid, gas, and steam), the ideal installed orientation of the wedge meter is 'on its side' or with the differential pressure branches coming out horizontally instead of up or down (See FIG. 2). This preferred orientation prevents gas pockets, liquid droplets, and/or debris from settling on the remote seals and allows particulates to flow past the wedge element. Some commercially-available differential pressure transmitter mounting methods locate the differential pressure transmitter directly above the process fluid pipe which is undesirable with hot processes as the differential pressure transmitter may overheat, or directly below the pipe which is undesirable as the floor or ground may be in the way and accessing the transmitter electronics is more difficult. Finally, a mounting bracket welded on to the meter is less adjustable for unanticipated spatial issues than one that is bolted on to any number of available locations. Yet another limitation is the aesthetics since a protruding cantilevered support can look like an afterthought to the design of an integrated meter.

In accordance with the various embodiments described below, a system and method are provided for mounting a field device, such as a differential pressure transmitter, to a process pipe flange or spool-style flow meter utilizing the studs that close a flanged connection. When coupled with the studs of the flanged connection, a mounting bracket positions the field device at a safe-from-overheating distance between the high- and low-pressure remote seal flange pressure taps in a vibration-resistant manner reducing or minimizing the potential for zero drift and reducing or minimizing remote seal capillary length.

Figure 3:
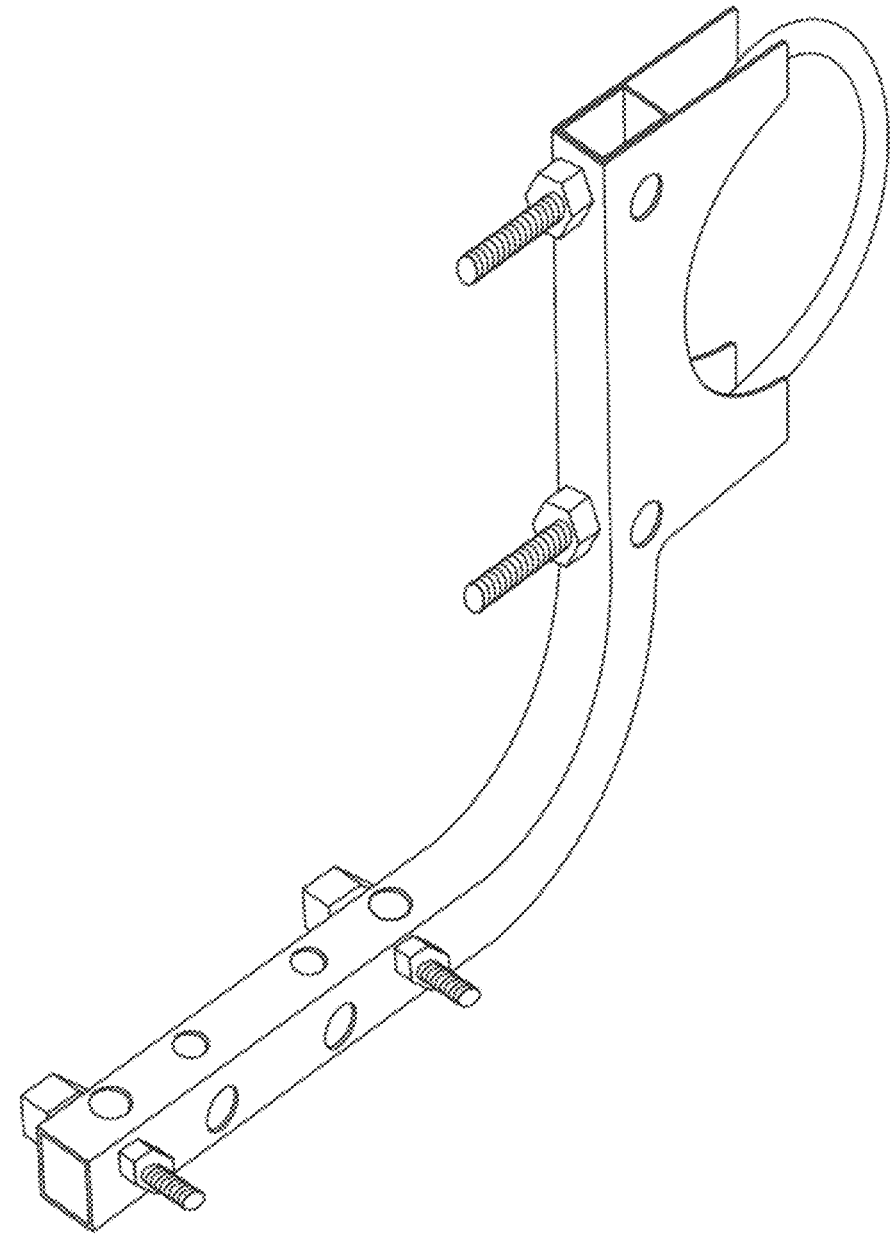
FIG. 3 is a perspective view of a known "L-shaped" bracket used to mount field devices using a pipe clamp.

Although embodiments described herein provide significant advantages for wedge-type flow meters, those skilled in the art will appreciate that embodiments can be practiced in any application in which a field device needs to be mounted relatively close to process fluid conduits and where threaded fasteners, such as studs, bolt, and nuts, are used to couple process fluid conduit flanged connections. Additionally, embodiments may be practiced in combination with commercially available mounting brackets, such as the standard L-shaped mounting bracket available from the Rosemount business unit of Emerson Automation Solutions. This bracket, shown in FIG. 3, is extremely versatile and enjoys significant industry adoption. However, it does require mounting a pipe clamp to a 2" pipe which then means the user is responsible for installing the 2" pipe at an appropriate location. For any field device instrumentation including but not limited to differential pressure transmitters, cost-savings may be obtained by mounting the instrument directly to process flange studs when or if practical, in accordance with embodiments described herein.

Figure 4:
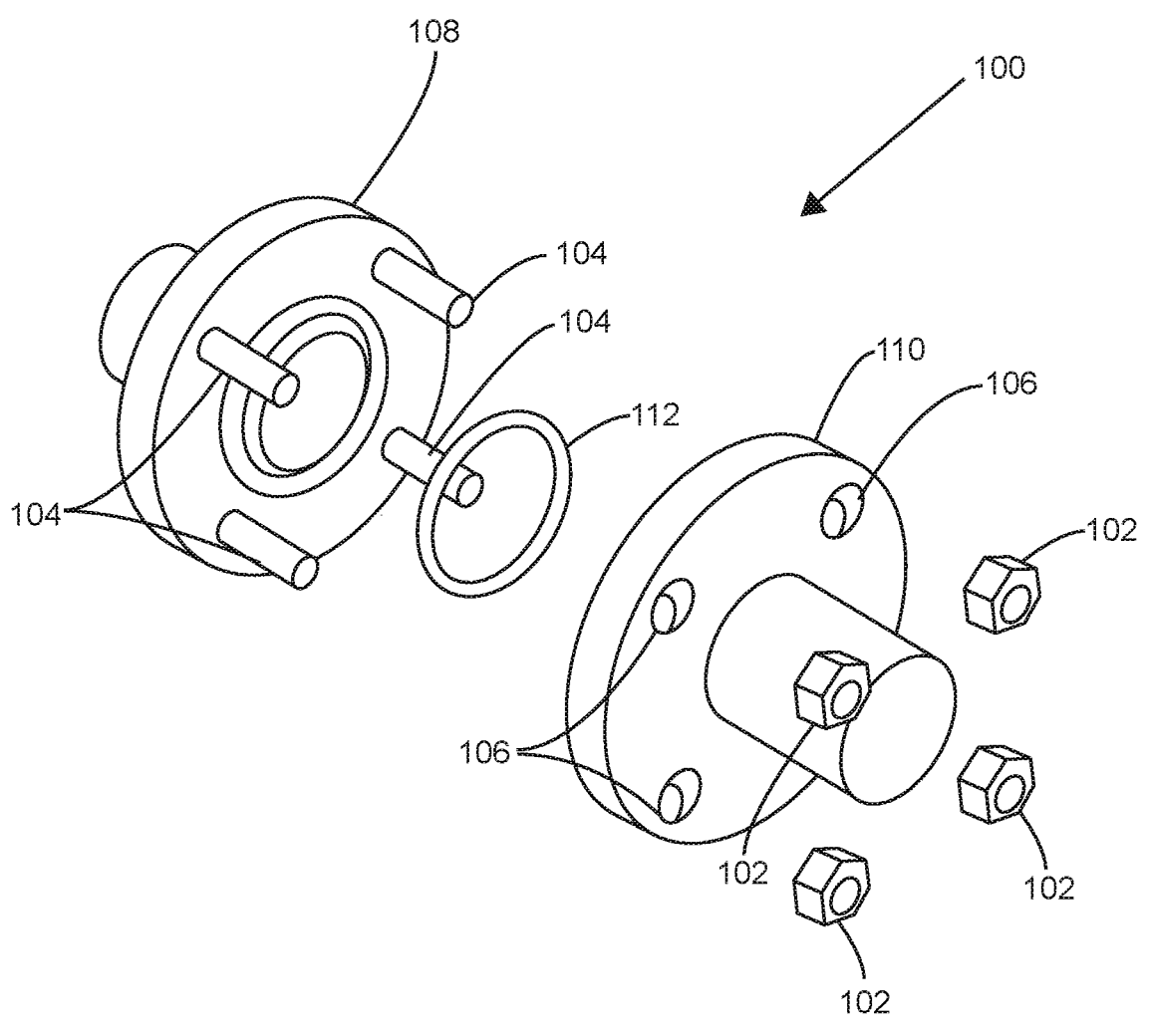
FIG. 4 is a diagrammatic view of a generic flange connection used in combination with embodiments of the present invention.

Embodiments described herein generally leverage the presence of a flanged connection for mounting the field device. FIG. 4 illustrates a generic flanged connection 100 that is sealed or closed by tightening nuts 102 on studs 104 that pass through apertures 106 bringing flanges 108, 110 together around a gasket or O-ring 112. This standard process remains unchanged if utilizing embodiments described herein. The disclosed field device mounting system and method allow the field device to be installed or removed without compromising the flange seal or loosening any pressure retaining nuts.

FIGS. 5-7 illustrate various mounting brackets that are affixed to a pair of process flange connection studs on a single flange connection or a single stud on each of two parallel flanged connections in accordance with embodiments of the present invention.

Figure 5A:
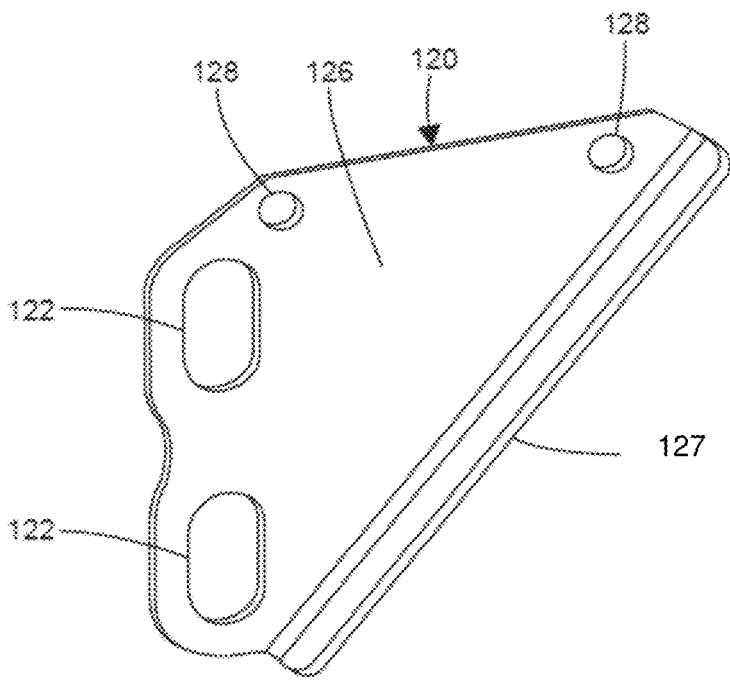
FIGS. 5A, 5B, 6A, 7A and 7B illustrate various mounting brackets that are affixed to a pair of process flange connection studs on a single flange connection or a single stud on each of two parallel flanged connections in accordance with embodiments of the present invention.
Figure 5B:
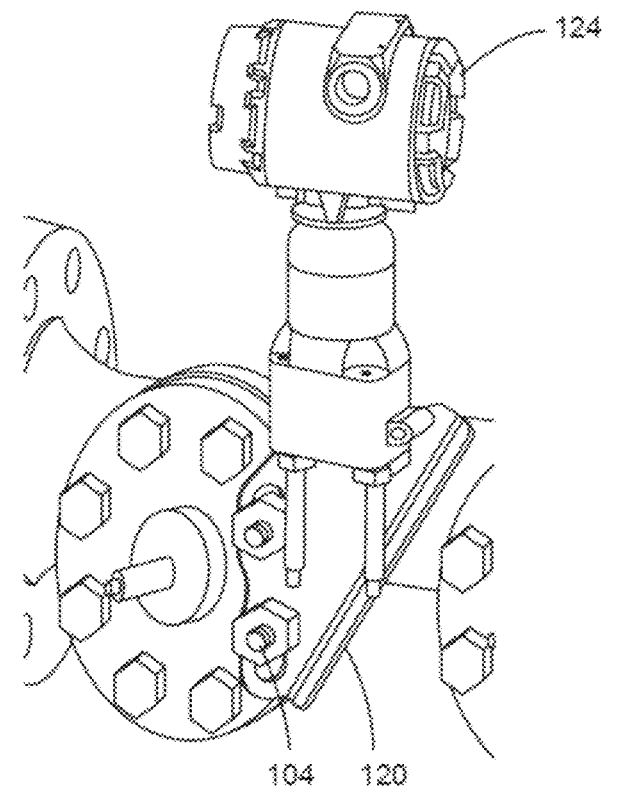

FIG. 5A shows a bracket 120 having a pair of holes or slots 122 that mount to studs 104 of a single process fluid flange in accordance with an embodiment of the present invention. The illustrated bracket is suitable for 2" NPS 150# through 600# flanges and mounts the differential pressure transmitter 124 (shown in FIG. 5B) in an upright position. Additionally, bracket 120 may include rib 127426 that is bent approximately 90 degrees from the plane of bracket 120 to provide additional strength. While rib 127426 is shown at an edge of bracket 120, it is expressly contemplated that rib 127426 could be positioned at a different location. Further, additional ribs 127426 or other suitable structures could be used to fortify the bracket 120.

As shown, mounting bracket 120 includes a primary face 126 in which there are through-holes 122, 128 for mounting the transmitter 124 (and coplanar adaptor) or instrumentation to the bracket and for mounting bracket 120 to the flange studs 104 and nuts. In the illustrated example, bracket 120 locates transmitter 124 outside the flanged area, ideally level to the horizontal plane and far enough away from the process so as to prevent subjecting the transmitter electronics to unacceptably elevated temperatures under hot process conditions due to heat radiation and convection. The through-holes 122 for the flange studs may be slots (as shown) so that one design can be applicable to multiple flange pressure classes or line sizes.

Figure 6A:
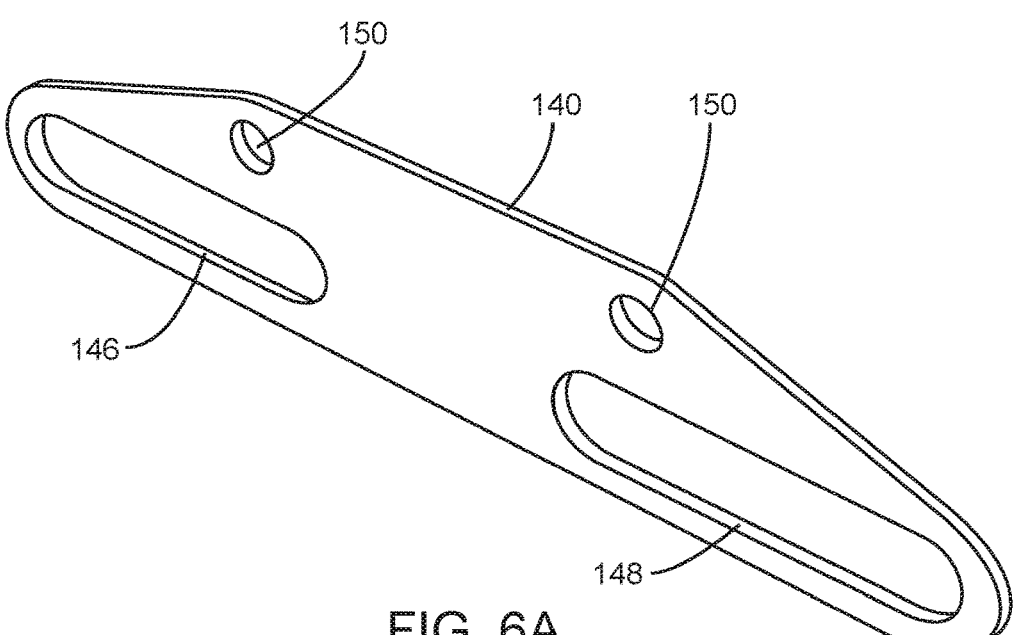
Figure 6B:
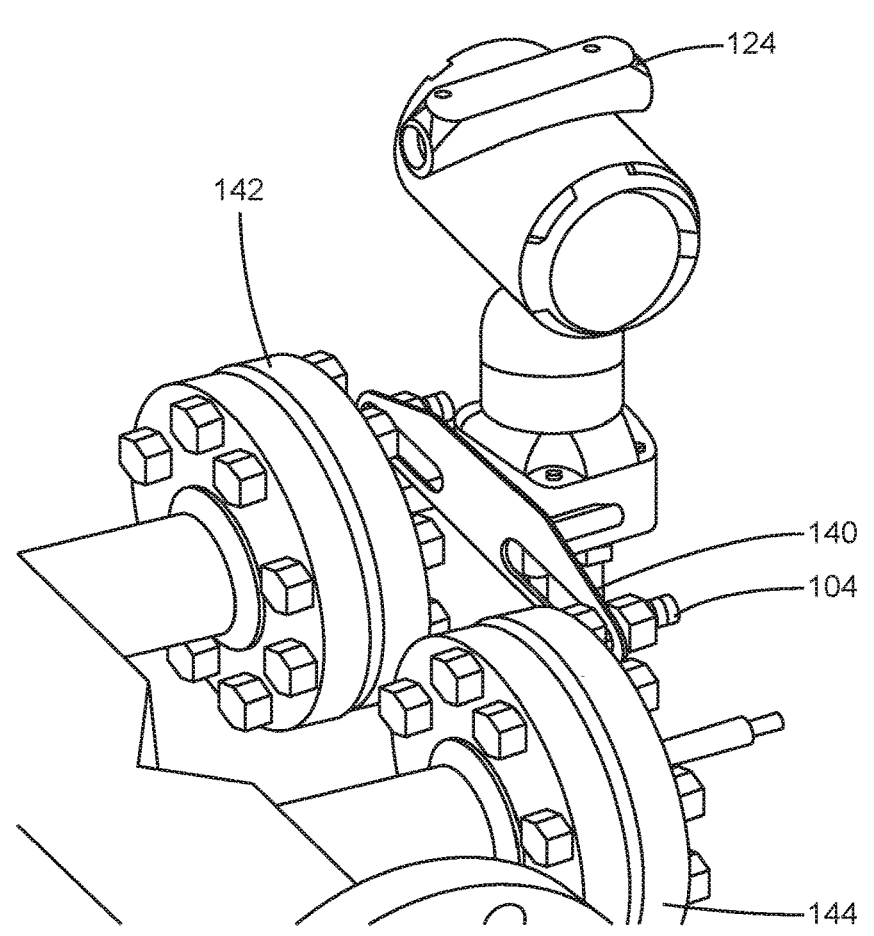

FIGS. 6A and 6B shows a bracket 140 mounting a differential pressure transmitter 124 to a pair of parallel process flanges 142, 144 in accordance with another embodiment of the present invention. In the illustrated embodiment, bracket 140 includes two elongated slots 146, 148 that are each configured to mount to a stud 104 of a respective process flange. Bracket 140 also includes a pair of mounting holes 150 configured to mount differential pressure transmitter 124. Bracket 140 may also include structural ribs (not pictured).

Figure 7A:
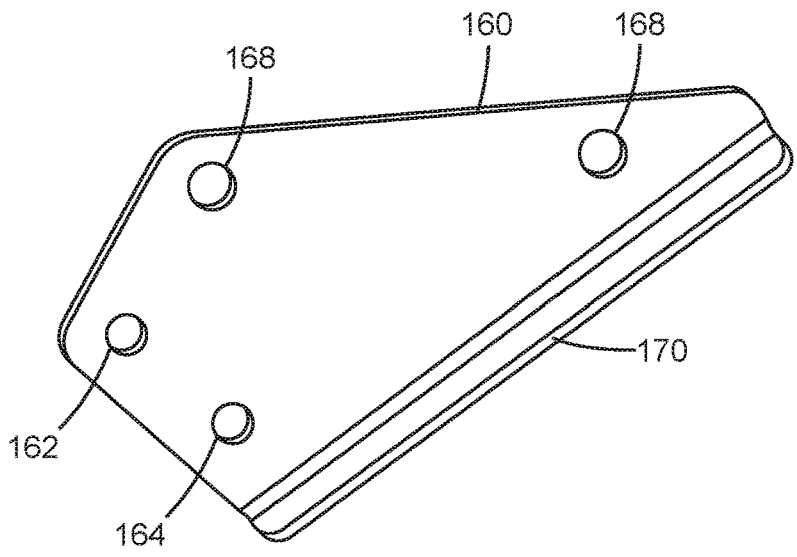
Figure 7B:
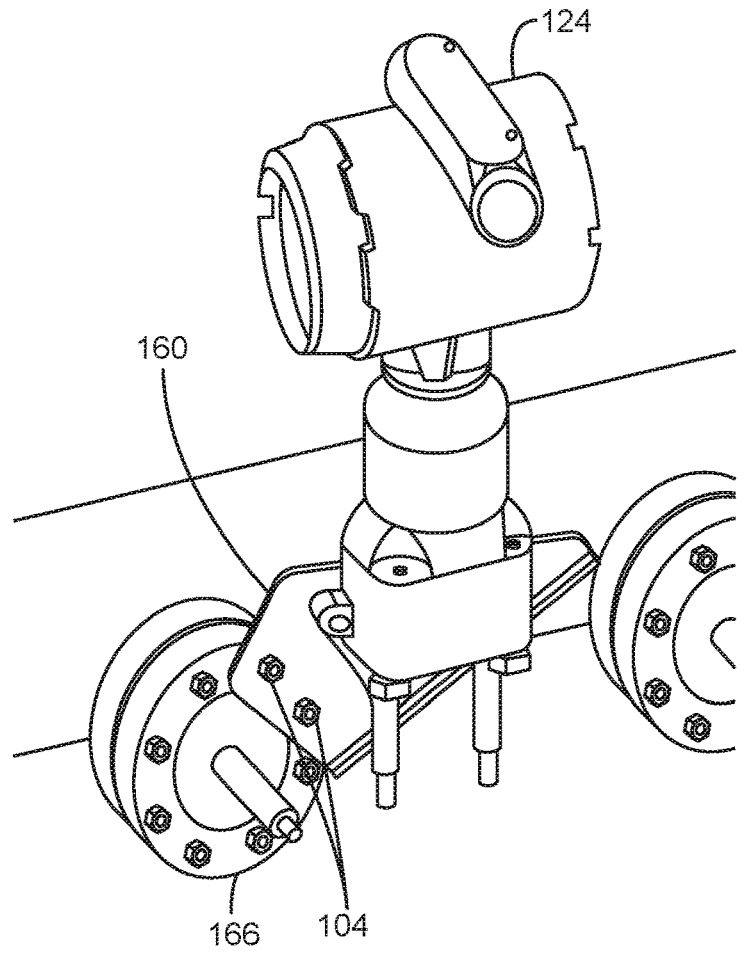

FIGS. 7A and 7B show bracket 160 having a pair of holes 162, 164 spaced to mount to studs 104 of a WSP remote seal flange 166 in accordance with an embodiment of the present invention. Bracket 160 also includes a pair of mounting holes 168 disposed to mount to differential pressure transmitter 124. Bracket 160 is also illustrated having a rib 170, similar to rib 127426 of bracket 120 (shown in FIG. 5).

Figure 8:
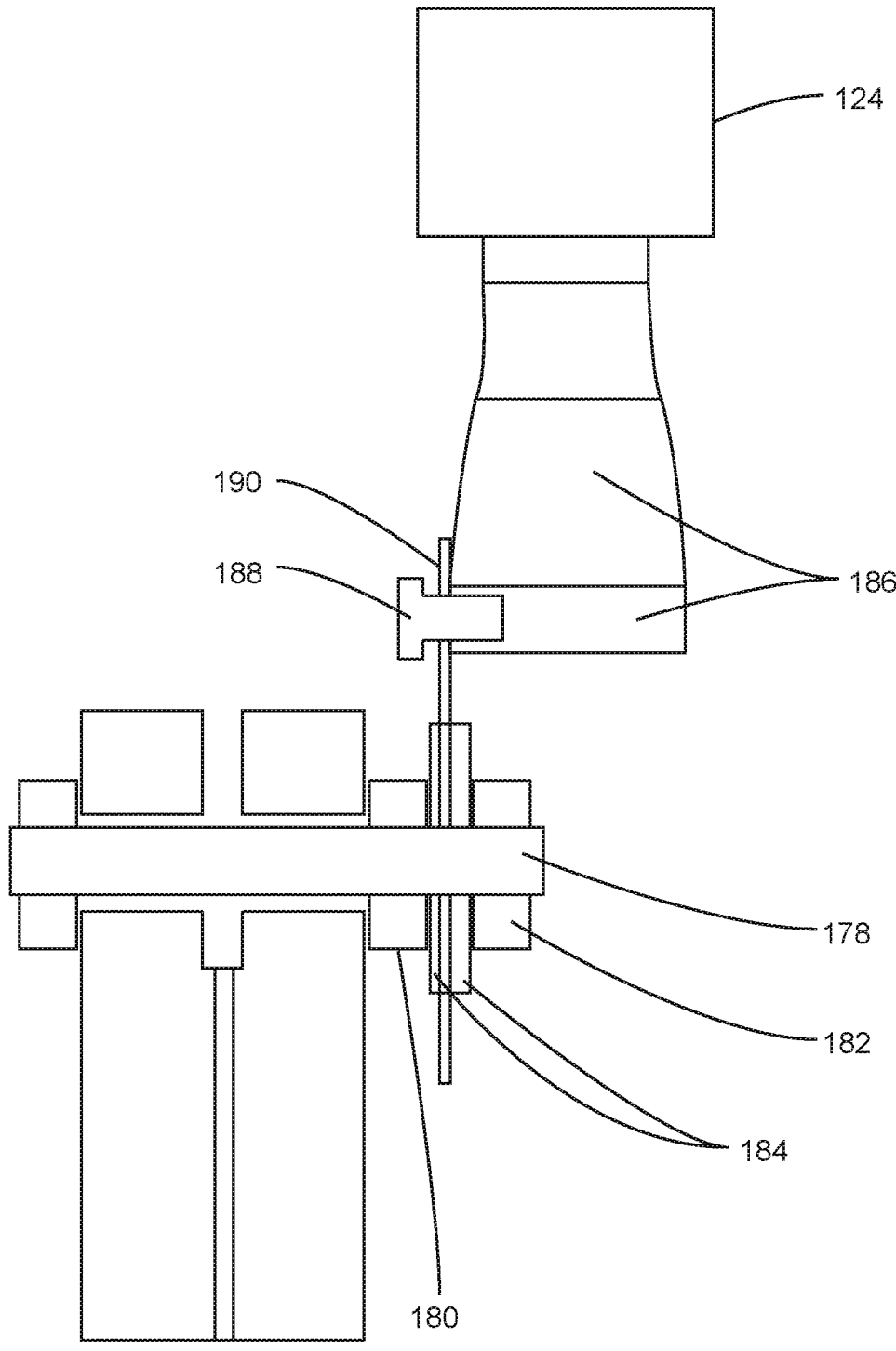
FIG. 8 is a diagrammatic view illustrating how a field device mounting bracket affixes to a flange stud in accordance with an embodiment of the present invention.

FIG. 8 is a diagrammatic view illustrating how a field device mounting bracket, such as brackets 120, 140, and 160 affixes to a flange stud in accordance with an embodiment of the present invention. The process flange connection is sealed or closed by normal installation practices and normal parts/hardware with the exception that two of the flange studs 178 that have an extended length protruding on one end past the pressure-retaining flange nut 180. The mounting bracket is then positioned adjacent the backside of the pressure-retaining flange nuts 180 on the extended length studs 178 by an extra set of nuts 182 screwed onto the extended length of the studs 178. An optional set of washers 184 is sandwiched between the bracket and the nuts 180, 184. FIG. 8 also illustrates transmitter 124 having a coplanar adapter 186 being mounted to the transmitter mounting bracket using a transmitter bracket bolt 188 and a transmitter bracket washer 190.

Figure 9A:
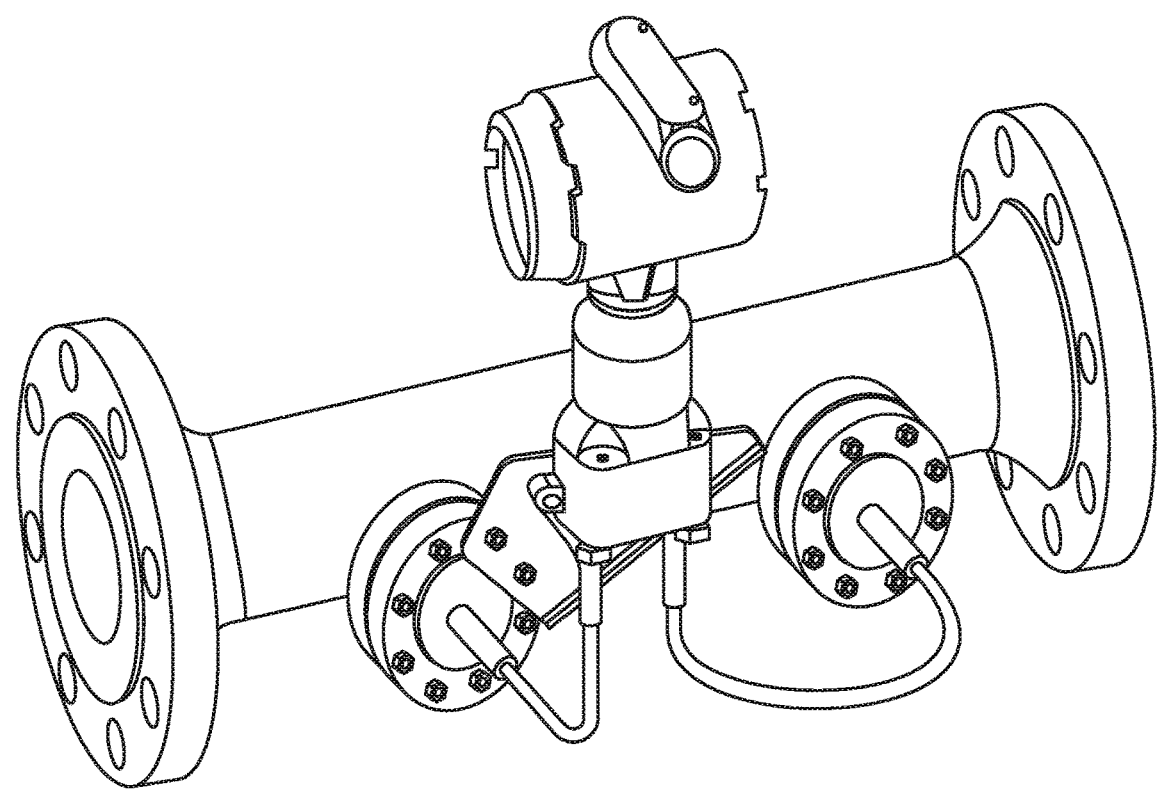
FIGS. 9A and 9B illustrate utilization of a differential pressure mounting bracket in accordance with another embodiment of the present invention.
Figure 9B:
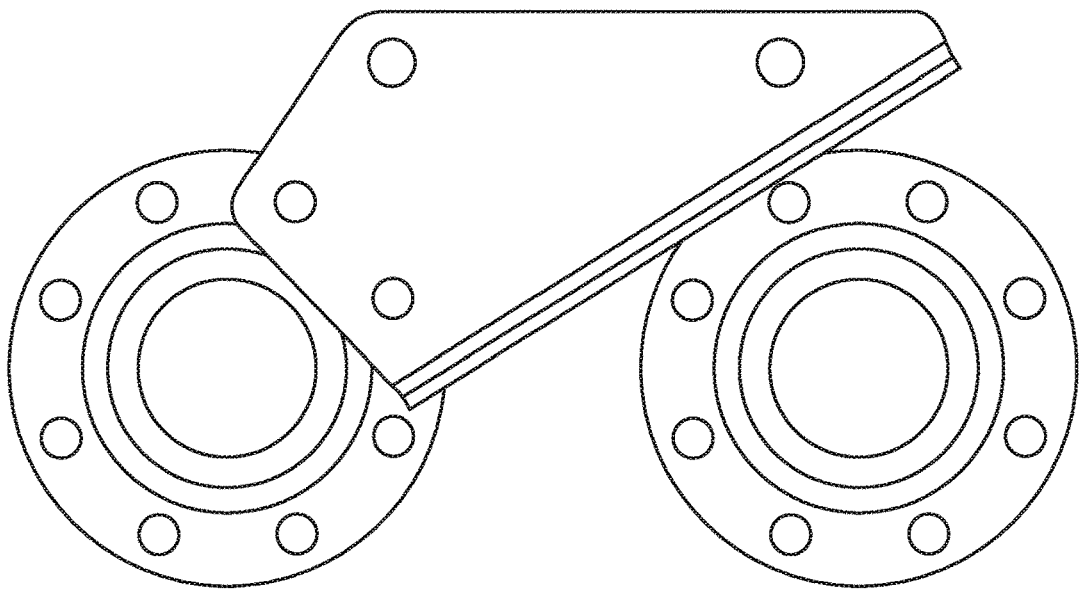

FIGS. 9A and 9B illustrate utilization of a differential pressure mounting bracket in accordance with another embodiment of the present invention. The transmitter mounting bracket shown in FIGS. 9A and 9B is similar to that shown in FIGS. 7A and 7B. The embodiment shown in FIGS. 9A and 9B is designed such that when the differential pressure branches are as close together as possible for a wedge flow meter design per ISO 5167-6 [Measurement of fluid flow by means of pressure differential devices inserted in circular cross-section conduits running full Part 6: Wedge meters], the transmitter and bracket can still be located favorably without interference (FIG. 9B). Otherwise, material is minimized and the plate thickness and rib have been designed to provide the same rigidity as the standard transmitter L-bracket to reduce the perceived vibration at the transmitter. As shown in FIG. 9A, when the transmitter is mounted to a flange, the length of the capillary connections is significantly reduced in comparison to prior designs, such as shown in FIG. 1.

Figure 10:
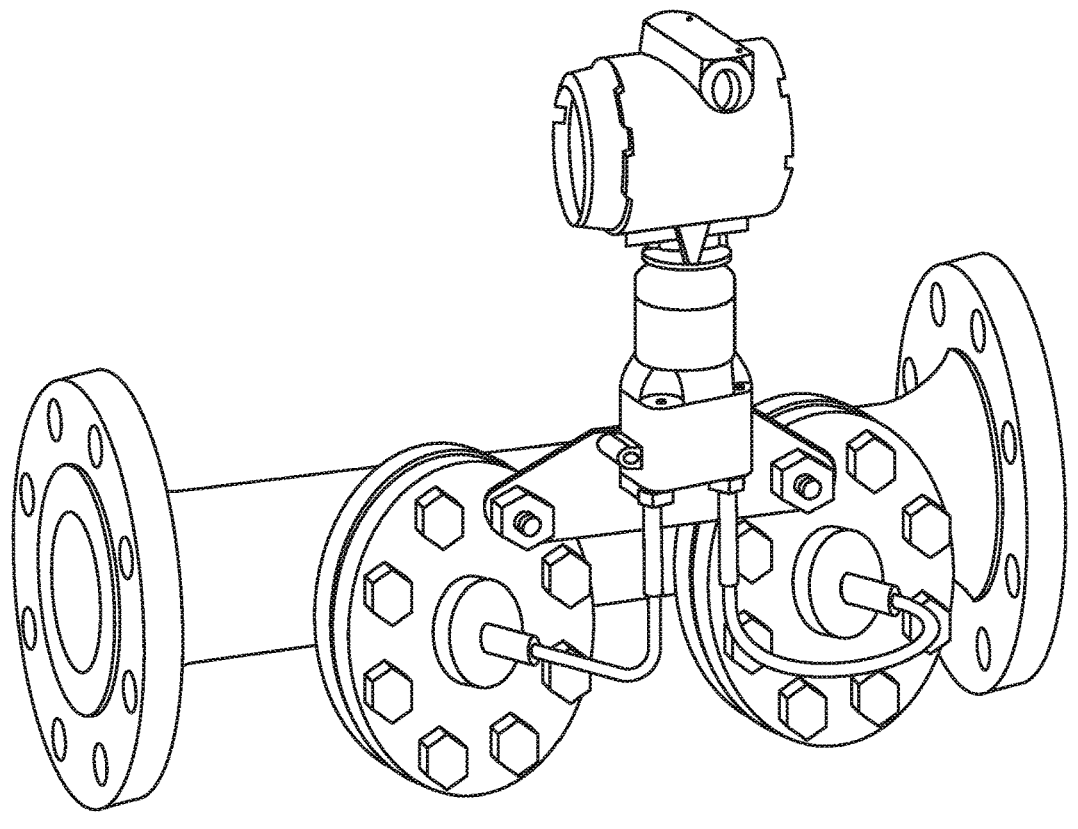
FIG. 10 illustrates a field device mounted to a pair of parallel flanges in accordance with an embodiment of the present invention.
Figure 11:
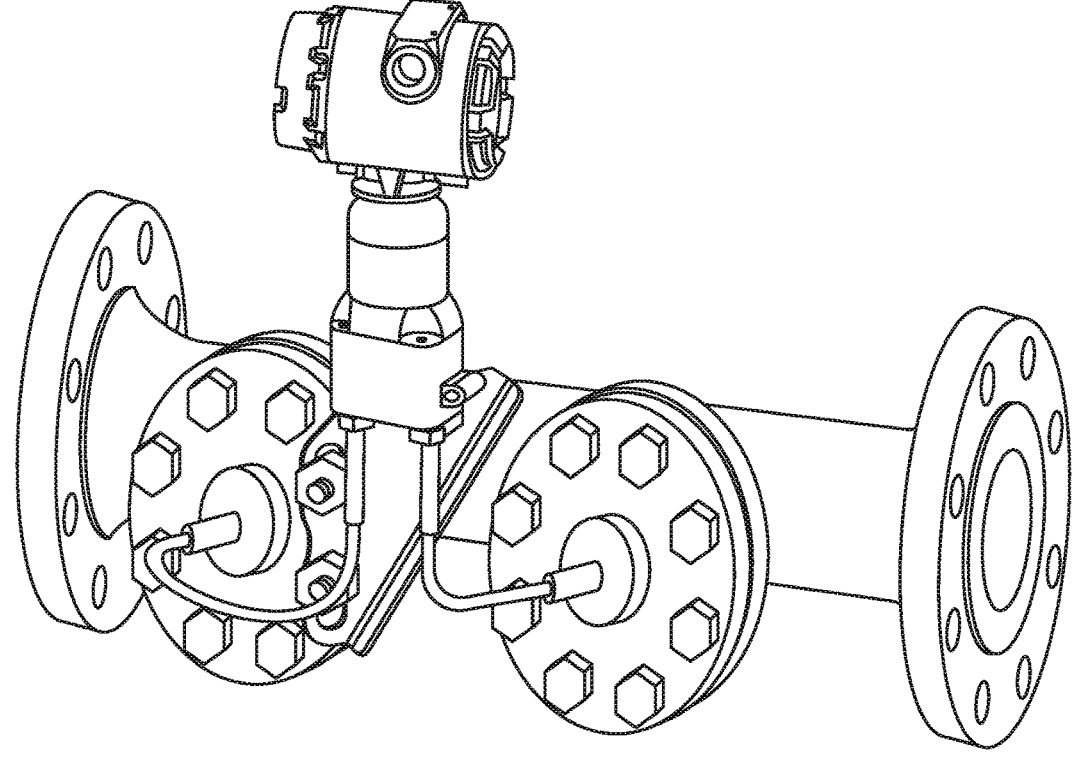
FIG. 11 illustrates a field device mounted to single flange in accordance with an embodiment of the present invention.

When the wedge-type flow meter has 2" NPS flanged branches, there are two different mounting bracket designs to be used depending on whether the flanged branches are close together (FIG. 10) or farther apart (FIG. 11). Both bracket designs will work for 150# through 600# flanges and combining the two brackets allows use within the limits of ISO 5167-6 without interference. The reason for the two designs is that as the differential pressure branch flanges move closer together, the single flange bracket (FIG. 11) will impede access to the parallel branch flange's studs and nuts unless the spanning bracket (FIG. 10) is used.

Figure 12:
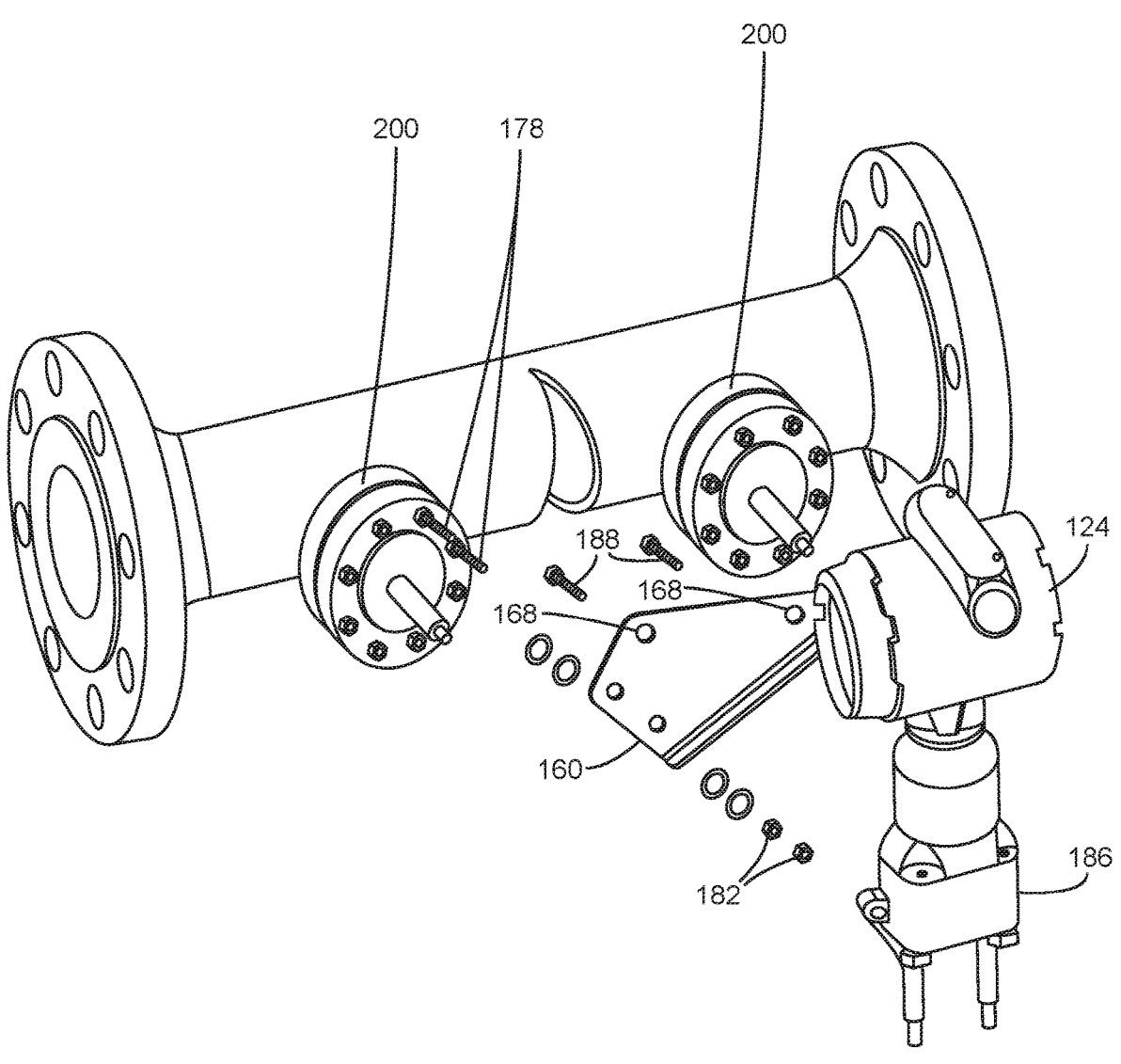
FIGS. 12 and 13 are diagrammatic exploded views of mounting field devices to process flanges in accordance with embodiments of the present invention.
Figure 13:
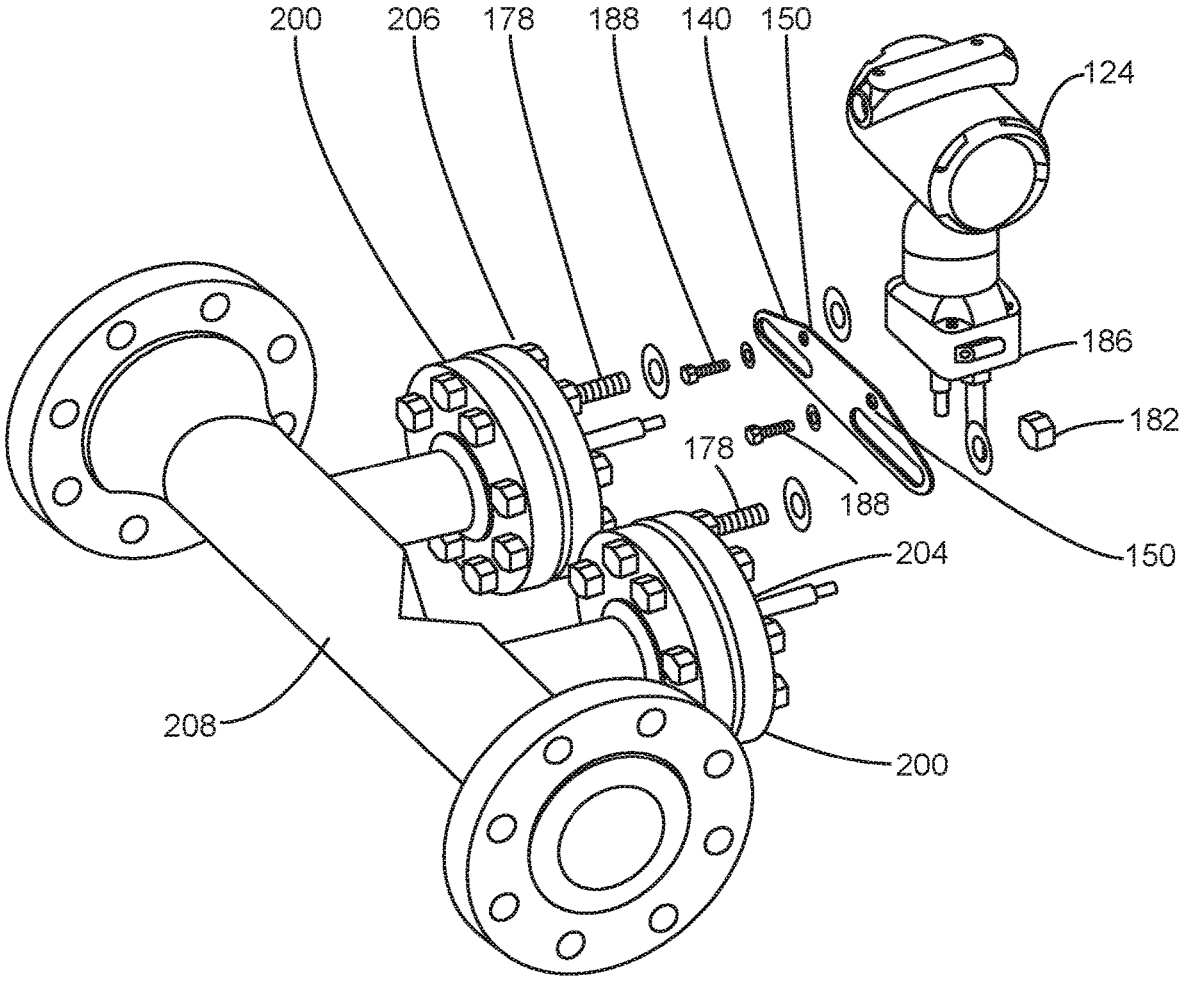

FIGS. 12-14 are diagrammatic exploded views of mounting field devices to process flanges in accordance with embodiments of the present invention.

FIG. 12 illustrates a transmitter mounting bracket 160 using process flange studs 178 to mount differential pressure transmitter 124 near WSP differential pressure branches 200. Transmitter bracket bolts 188 are positioned through transmitter mounting holes 168 and threaded into coplanar adapter 186. Then, bracket 160 is slid onto process flange studs 178, nuts 182 are tightened onto respective process flange studs 178. Process fluid connections from each respective pressure branch 200 to the differential pressure transmitter can be done in any suitable manner.

FIG. 13 illustrates a transmitter mounting bracket 140 using process flange studs 178 for 2" NPS flanged branches 200 spanning two parallel flanges 204, 206. Transmitter bracket bolts 188 pass through transmitter mounting holes 150 into coplanar adapter 186 of transmitter 124. Nuts 182 are threaded onto process flange studs 178 to mount transmitter 124 to parallel flanges 204, 206. As can be seen, transmitter 124 is mounted in an upright position in a location that is neither directly above nor below the process fluid conduit 208.

Figure 14A:
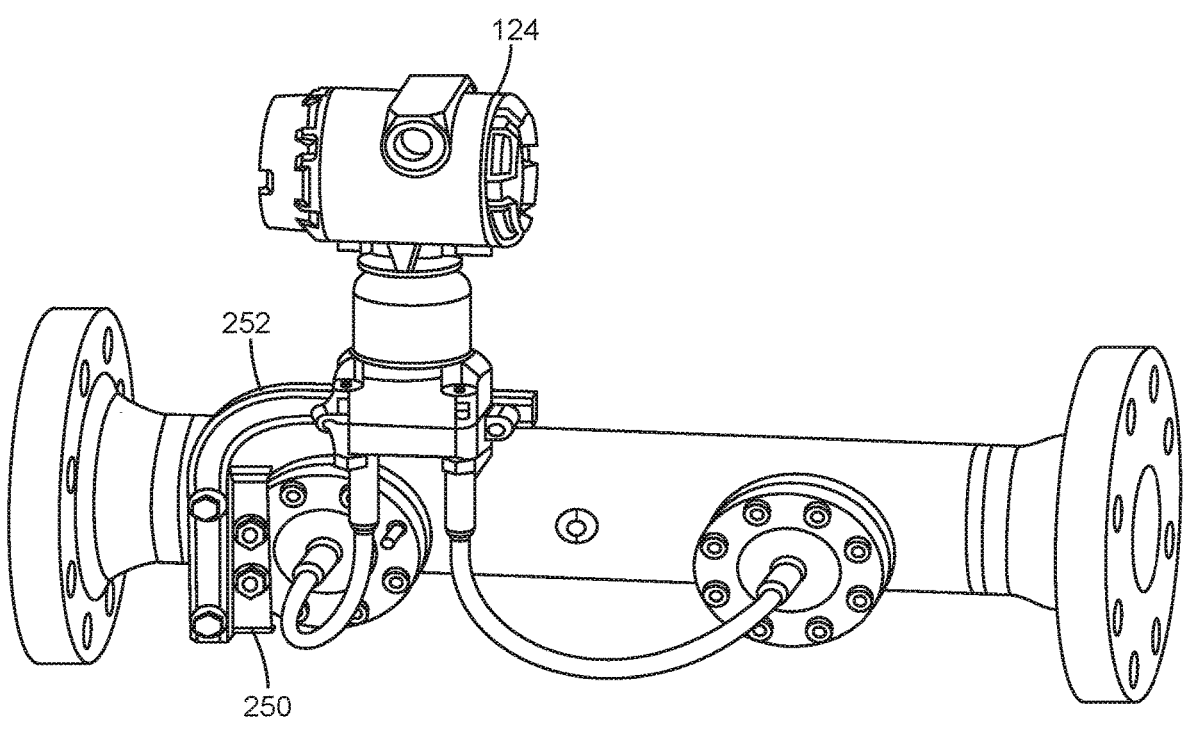
FIGS. 14A and 14B are diagrammatic views of a mounting bracket (FIG. 14B) coupled to a standard L-bracket to mount a field device in accordance with an embodiment of the present invention.
Figure 14B:
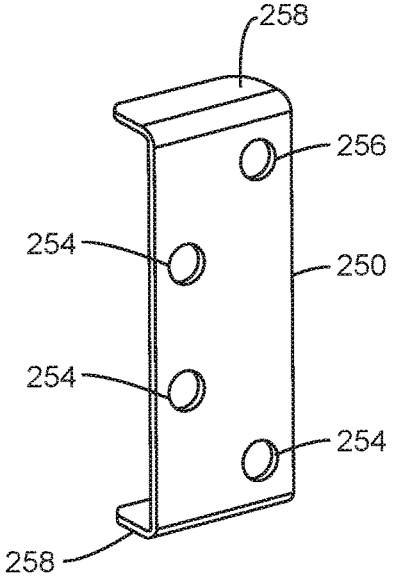

FIGS. 14A and 14B are diagrammatic views of a mounting bracket 250 (FIG. 14B) coupled to a standard L-bracket 252 to mount a field device 124 in accordance with an embodiment of the present invention. As shown, mounting bracket 250 includes a pair of holes 254 for mounting to process flange studs. Further, bracket 250 also includes a plurality of holes 256 for coupling to L-bracket 252. As in other embodiments, bracket 250 may include one or more ribs 258 to increase strength.

Figure 15:
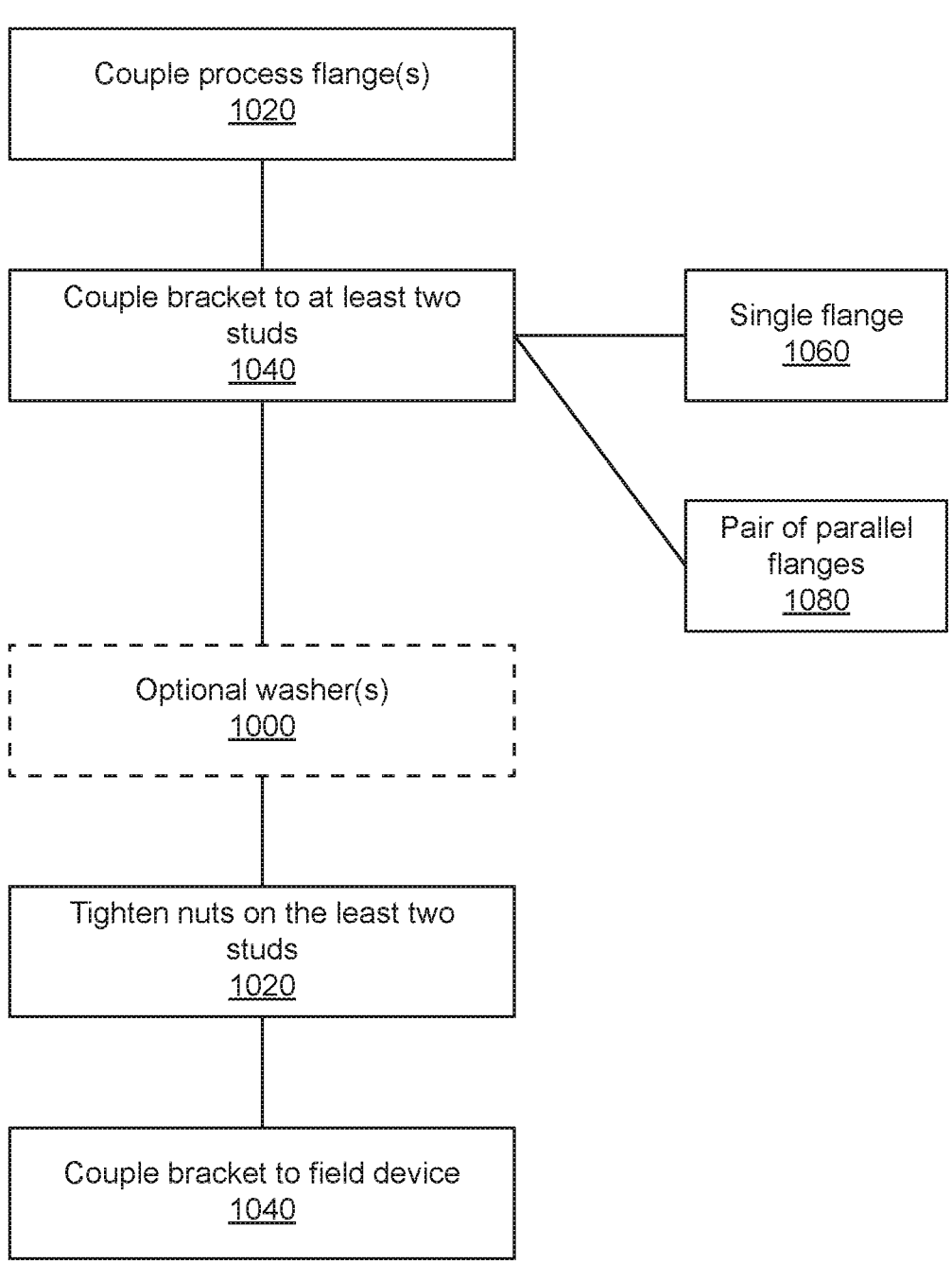
FIG. 15 is a flow diagram of a method of coupling a field device, such as a differential pressure transmitter, to one or more flanges in accordance with an embodiment of the present invention.

FIG. 15 is a flow diagram of a method of coupling a field device, such as a differential pressure transmitter, to one or more flanges in accordance with an embodiment of the present invention. Method 1000 begins at block 1020 where at least one process flange is coupled together. As set forth above, this typically involves a number of threaded studs extending through mounting holes of both portions of the process flange coupling and engaging nuts to draw the two portions together. An O-ring or other suitable sealing element (such as that shown in FIG. 4) is typically disposed between the two portions. Note, while embodiments have been described with respect to coupling the mounting bracket to the studs after the flange connection has been generated, it is expressly contemplated that such coupling could occur during the creation of the flange connection. In such instance, blocks 1020 and 1040 would be combined. However, there is an advantage in coupling the bracket to two or more process studs after the flange coupling has been created. Specifically, when the bracket is coupled after, then the bracket could be subsequently removed without affecting the process flange connection. As shown at block 1040, coupling the bracket to at least two flange studs can be to two studs of a single flange, as indicated at reference numeral 1060 or stud of two different parallel flanges as indicated at reference numeral 1080.

Method 1000 continues at optional block 1100 where washers may be installed on the process flange studs, if desired. Then, at block 1120, additional nuts are installed on the process flange studs to tighten the bracket to the process flange studs. In embodiments where the bracket is installed during creation of the process flange connection(s) such additional nuts would not be required. Next, at block 1140, the field device is mounted to the bracket. However, it is also contemplated that the field device can be mounted to the bracket before the bracket is coupled to the process flange studs.

Embodiments described herein provide a number of advantages over current designs. Such advantages include, without limitation: reducing the cost of mounting as compared to a cantilevered pipe or bar welded to the meter; locating the transmitter in an easy-to-access location between the high and low pressure taps of the wedge flow meter on the same side of the meter as the remote seals, enabling minimal capillary lengths while being outside of the brunt of the radiant heat from a hot process pipe; locating the transmitter in a location supporting the preferred wedge meter orientation with the differential pressure branches protruding in the horizontal direction (as illustrated in FIGS. 12-13); bolting on to the flow meter to enable an adjustable location (it does not require being welded to the meter); mechanically avoiding zero drift under long term process pipe vibration; and ensuring that the transmitter will not rotate as it may with a pipe clamp.

Although the present invention has been described with reference to preferred embodiments, workers skilled in the art will recognize that changes may be made in form and detail without departing from the spirit and scope of the invention. For example, while embodiments have been described with respect to brackets that mount to horizontal differential pressure branches, those skilled in the art will recognize that modifications can be made to employ brackets that mount to vertical or angled differential pressure branches and then still mount the differential pressure transmitter in a preferred orientation. Brackets for such additional orientations may have ribs, bends, gussets, or other suitable reinforcements in locations configured to ensure structural integrity for their intended functions.

What is claimed is:

1. A process fluid sensing assembly comprising:
a process fluid conduit having a partial fluid obstruction therein, the process fluid conduit having a first differential pressure branch with a first flanged connection and a second differential pressure branch with a second flanged connection;
a first remote seal coupled to the first flanged connection;
a second remote seal coupled to the second flanged connection;
a mounting bracket mounted to at least two threaded process flange studs of at least one flanged connection; and
a field device mounted to the mounting bracket and fluidically coupled to the first remote seal via a first flexible capillary conduit connection and fluidically coupled to the second remote seal via a second flexible capillary conduit connection,
wherein the mounting bracket is coupled to the first and second flanged connections.

2. The process fluid sensing assembly of claim 1, wherein the mounting bracket is configured to be affixed to extended length process flange threaded studs by additional flange nuts.

3. The process fluid sensing assembly of claim 1, wherein the bracket has at least one aperture on a primary bracket face for engaging at least two threaded process flange studs, wherein engagement of two flange studs inhibits rotation of the field device due to field pipeline vibrations.

4. The process fluid sensing assembly of claim 3, wherein the at least one aperture includes at least one slot.

5. The process fluid sensing assembly of claim 1, wherein the mounting bracket has through-hole(s) for bolting to the field device.

6. The process fluid sensing assembly of claim 1, wherein the first differential pressure branch and the second differential pressure branch extend in a horizontal direction.

7. The process fluid sensing assembly of claim 6, wherein the field device is mounted vertically.

8. The process fluid sensing assembly of claim 6, wherein the mounting bracket locates the field device between the first and second differential pressure branches on a wedge flow meter.

9. The process fluid sensing assembly of claim 8, wherein the field device is a differential pressure transmitter.

10. The process fluid sensing assembly of claim 1, wherein the mounting bracket is configured to position the field device at a location sufficiently spaced from process piping to protect electronics of the field device from process fluid temperature.

11. The process fluid sensing assembly of claim 1, wherein the mounting bracket has a rib.

12. A wedge-type flow meter comprising:
a spool configured to mount to process piping, the spool having a wedge disposed therein to partially obstruct process fluid flowing through the spool, the spool also having a pair of differential pressure branches, each branch having a process flange;
a first remote seal coupled to a first process flange of one of the differential pressure branches, the first remote seal having a first capillary tube extending therefrom;
a second remote seal coupled to a second process flange of the other of the differential pressure branches, the second remote seal having a second capillary tube extending therefrom;
a bracket mounted to at least one threaded fastener of each of the first and second process flanges; and
a differential pressure transmitter fluidically coupled to the first and second capillaries, the differential pressure transmitter being mounted to the bracket.

13. The wedge-type flow meter of claim 12, wherein the pair of threaded fasteners mounting the bracket to at least one process flange each has a length that is longer than other threaded fasteners coupling the process flange.

14. The wedge-type flow meter of claim 12, wherein the pair of differential pressure branches is configured to extend horizontally and the bracket is configured to mount the differential pressure transmitter vertically.

15. The wedge-type flow meter of claim 12, wherein the threaded fasteners are flange studs.

* * * * *